US005333448A

United States Patent [19]

Salecker

[11] Patent Number: 5,333,448

[45] Date of Patent: Aug. 2, 1994

[54] FLUID CONTROL NOZZLE FOR CONDUIT CLEANER

[75] Inventor: Roy W. Salecker, Mendota, Ill.

[73] Assignee: Spartan Tool Div. of Pettibone Corp., Mendota, Ill.

[21] Appl. No.: 46,441

[22] Filed: Apr. 13, 1993

[51] Int. Cl.[5] .......................... F16D 31/00; B08B 1/00

[52] U.S. Cl. .................................... 60/325; 15/104.09; 15/104.12

[58] Field of Search ............... 60/325, 242; 15/104.09, 15/104.12

[56] References Cited

U.S. PATENT DOCUMENTS

| | | | |
|---|---|---|---|
| 1,584,740 | 5/1926 | Denny | 15/104.12 |
| 3,740,785 | 6/1973 | Latall | 15/104.05 |
| 4,795,495 | 1/1989 | Dobson, Sr. | 15/104.09 |
| 4,909,325 | 3/1990 | Hopmann | 15/104.12 X |
| 4,985,763 | 1/1991 | Fraser | 15/104.12 X |
| 5,090,079 | 2/1992 | Allison et al. | 15/104.09 X |

FOREIGN PATENT DOCUMENTS

| | | | |
|---|---|---|---|
| 677807 | 6/1991 | Switzerland | 15/104.09 |

*Primary Examiner*—Edward K. Look
*Assistant Examiner*—Hoang Nguyen
*Attorney, Agent, or Firm*—Wood, Phillips, VanSanten, Hoffman & Ertel

[57] ABSTRACT

A power unit for a conduit cleaner. The conduit cleaner has a motor with a housing carrying a shaft that is rotatable about an axis. The motor operates in response to the introduction of a pressurized fluid. The housing has inlets for admitting pressurized fluid and an outlet to permit the discharge thereof. A nozzle is connected to the housing and is configured to direct fluid from a pressurized supply to the housing inlet and direct fluid discharged from the outlet out of the power unit. The nozzle has a substantially cylindrical outer surface. In one form, the nozzle does not project beyond the cylindrical outer surface. Accordingly, a compact unit can be made according to the present invention. The absence of radially projecting structure also avoids protrusions that may intercept roots or other foreign matter within a conduit and thereby interrupt free movement of the conduit cleaner through a conduit.

19 Claims, 3 Drawing Sheets

FLUID CONTROL NOZZLE FOR CONDUIT CLEANER

BACKGROUND OF THE INVENTION

1. Field of the Invention

This invention relates to conduit cleaners and, more particularly, to a nozzle assembly that controllably directs fluid from a pressurized supply to a fluid operated motor and exhausts the same therefrom.

2. Background Art

Fluid operated conduit cleaners are well known in the prior art. Compact, commercially available, fluid operated motors, that can be incorporated into these conduit cleaners, are presently commercially available. Known conduit cleaners incorporate these motors in much the same manner as is done in the structure in U.S. Pat. No. 3,740,785, to Latall.

More particularly, a nozzle/thruster section, defining a pressure chamber and a plurality of circumferentially spaced jet orifices in communication therewith, is attached at the trailing end of the motor. In one known construction, the motor is modified by welding a nipple to the trailing end thereof, which facilitates threaded connection of the nozzle section to the motor.

One particular problem with this construction is that, in addition to requiring multiple parts, a lengthy nozzle section is used which adds considerably and undesirably to the overall length of the conduit cleaner. This extended nozzle construction has the additional drawback that it, in conjunction with a multi-runner skid assembly, defines a captive space for foreign matter that may be encountered within a conduit, which foreign matter may inhibit or prohibit the withdrawal of the cleaner from a conduit. As can be seen in Latall, a substantial space exists. between the nozzle section and a surrounding skid assembly, which space is readily penetrable by roots and other foreign matter.

The interconnection of the pressure chamber on the nozzle and motor creates another problem in Latall. More specifically, the conduit which communicates between the pressure chamber and motor runs externally of the unit, which adds to the radial dimension thereof and introduces an additional structure which is prone to hangup in the conduit.

The nozzle section in Latall includes a plurality of circumferentially spaced jet orifices which direct fluid from the pressure chamber radially outwardly and in a trailing direction to produce a propulsion force and additionally scour the conduit within which the cleaner resides. The orifices are bored directly through the body of the nozzle section. This construction has several drawbacks.

First of all, each nozzle section has fixed flow characteristics by reason of the fixed diameter of the jet orifices. In the event that one wishes to alter the operating characteristics of the conduit cleaner, the nozzle must be disassembled and replaced with a fully assembled nozzle having jet orifices of a different size. As can be seen in Latall, a substantial amount of disassembly is required to remove the nozzle. Assembly of a replacement nozzle is equally complicated. The nozzle section also obstructs access to bolts used to maintain the nozzle section and motor in operative relationship.

In addition to the time consuming and complicated nature of this process, the user is required to keep on hand a suitable supply of nozzles to permit the desired reconfiguration of the conduit cleaner.

Because high pressure fluid is directed through the jet orifices, they are prone to wear. Designers must usually compromise between materials which wear well but whose cost makes it prohibitive to construct the complete nozzle therefrom, and a more affordable material that has less resistance to wear. Regardless of the material used, over time, the fluid will naturally enlarge the jet orifice size which alters the operating characteristics of the conduit cleaner. Once the size and shape of the jet orifices is appreciably altered, the entire nozzle section may be rendered useless. Since the nozzle section is relatively expensive and difficult to replace, the user may decide to use the defective unit at less than full efficiency rather than effecting the necessary repairs. Operation with a defective unit compromises the performance and reflects poorly on the manufacturer, even though the problem is attributable to normal wear.

Another problem with the conventional conduit cleaner is that it is difficult to effect lubrication thereof. Typically an outlet port on the unit has a fitting which defines a suitable opening to exhaust fluid. When it is desired to lubricate the unit, the user is required to remove this fitting and replace it with a grease fitting, as permits the introduction of lubrication through a conventional gun. Once the lubrication is completed, the grease fitting is removed and replaced with the fitting having the orifice. This operation is inconvenient and time consuming. Due to the inconvenience, there may be a tendency of the user to lubricate the unit less frequently than is necessary, which may shorten the life of the unit.

SUMMARY OF THE INVENTION

The present invention is specifically directed to overcoming the above enumerated problems in a novel and simple manner.

In one aspect of the invention, a power unit for a conduit cleaner is provided. The conduit cleaner has a motor with a housing carrying a shaft that is rotatable about an axis. The motor operates in response to the introduction of a pressurized fluid. The housing has inlets for admitting pressurized fluid and an outlet to permit the discharge thereof. A nozzle is connected to the housing and is configured to direct fluid from a pressurized supply to the housing inlet and direct fluid discharged from the outlet out of the power unit. The nozzle has a substantially cylindrical outer surface. In one form, the nozzle does not project beyond the cylindrical outer surface. Accordingly, a compact unit can be made according to the present invention. The absence of radially projecting structure also avoids protrusions that may intercept roots or other foreign matter within a conduit and thereby interrupt free movement of the conduit cleaner through a conduit.

In one form, the nozzle defines a pressure chamber that is in communication with the housing inlet. For simplicity, in terms of manufacture, assembly, and disassembly, the nozzle can be made as one piece.

The nozzle has a central axis. At least one jet orifice is defined in the nozzle for directing fluid from a pressurized supply away from the nozzle, and preferably angularly with respect to the power unit axis, whereby the discharging fluid effects propulsion of the conduit cleaner and also scours the conduit as to break loose foreign matter thereon.

A separate fitting can be used to define the .jet orifice. This has several advantages. First of all, the fitting can be made from a more durable material than the remaining portion of the nozzle. This more durable material, which may be stainless steel, is more expensive than normal materials from which the nozzle would be made. Consequently, it can be used strategically only at the jet orifices.

By removably connecting the fitting to the nozzle, fittings with different orifice sizes can be used interchangeably to alter the operating characteristics of the conduit cleaner. Accordingly, great versatility is afforded.

At the same time, in the event of wearing of the nozzle orifice, the fitting can be replaced, rather than replacing the entire nozzle, which is expensive and involves a complicated series of steps.

Another aspect of the invention is the provision of a grease fitting on at least one of the nozzle and motor housing. The grease fitting has a through bore in communication with the housing outlet to allow passage therethrough of fluid discharged from the housing outlet. The grease fitting thus serves the dual purpose of facilitating lubrication of the power unit and at the same time allowing the normal fluid travel.

The nozzle and motor cooperatively define a first subassembly with a substantially cylindrical outer surface. In one form, this outer surface is substantially uniform in diameter and matched to the outer surface of a wall on the nozzle. The nozzle wall has a flat, rearwardly facing surface. Structure is provided on the rear nozzle end to facilitate connection to a fluid supply conduit. In one form, only the connecting structure for the fluid supply conduit projects axially in a trailing direction beyond the flat, rearwardly facing nozzle surface. With this arrangement, the pressure chamber in the nozzle resides at least partially in axial coincidence with the wall of the nozzle.

In one form, the nozzle is connected to the housing by at least one fastener extending axially through the rearwardly facing fiat surface on the nozzle wall and into the motor housing. For convenience, the fastener resides radially outside of the connector for the fluid supply conduit. Accordingly, the fastener is readily accessible for assembly and disassembly of the nozzle.

Further, according to the present invention, a nozzle is provided for use in conjunction with a fluid operated motor having a shaft that is rotatable about an axis and a housing within which the shaft is rotatable and defining a fluid inlet and outlet. The nozzle has a body with first structure for directing fluid from a pressurized supply to an inlet on a motor housing and a second structure for directing fluid discharged from a motor housing outlet to externally of the nozzle. There is at least one bore in the nozzle body for simultaneously directing incoming fluid from a pressurized supply in a prescribed pattern to externally of the nozzle. A fitting with a through opening is connected to the body at least partially within the nozzle body bore so that incoming fluid from a pressurized supply can flow through the bores in both the nozzle body and fitting.

As previously described, fittings having different bore sizes can be interchanged. The fitting may extend partially, or more preferably, fully, between the ends of the nozzle body bore.

In one form, the fitting is threaded into the nozzle body and is rotatable using a conventional tool.

Still further, according to the present invention, a power unit is provided having a motor with a housing, as previously described, a nozzle connected to the motor and a grease fitting on at least one of the nozzle and motor housing and having a through bore in communication with the housing outlet to allow passage therethrough of fluid discharging from the housing outlet.

The grease fitting can be permanently or removably fixed in its operative position. Preferably, the exposed portion thereof is configured to fit to a conventional grease gun.

DETAILED DESCRIPTION OF THE DRAWINGS

Figure 1:
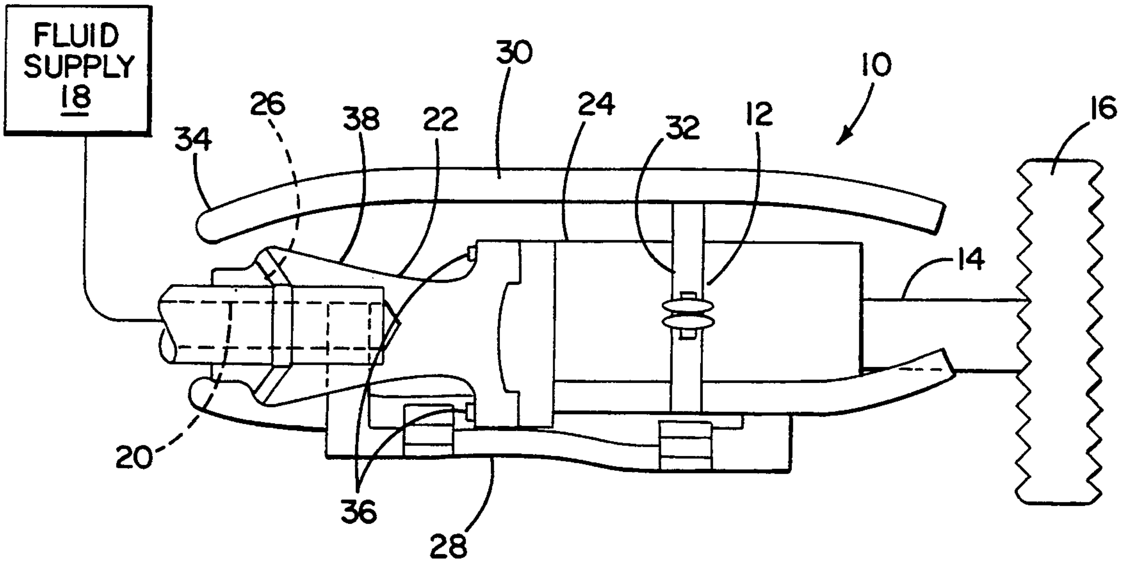
FIG. 1 (PRIOR ART)
FIG. 1 is a side elevation view of a prior art conduit cleaner.

In FIG. 1, a prior art conduit cleaner is shown at 10 in substantially the same form as that unit described in detail in U.S. Pat. 3,740,785, to Latall. The conduit cleaner includes a fluid operated motor 12 that has a rotatable shaft 14 which carries a cutting blade 16 to break up obstructions, such as roots and other foreign matter, in a conduit through which the conduit cleaner 10 is directed.

Pressurized fluid from a supply 18 is directed into a pressure chamber 20 in a nozzle section 22 connected to the trailing end 24 of the motor 12. The pressure chamber 20 is in fluid communication with a plurality of jet orifices 26 which direct the fluid in a radially outwardly and trailing direction so as to impinge upon the inside surface of a conduit within which the conduit cleaner 10 resides. This discharge of fluid effects propulsion of the conduit cleaner 10 and simultaneously breaks tip material adhered to the conduit walls, such as paraffin, grease, and the like.

An external pipe 28 simultaneously delivers fluid from the pressure chamber 20 to the motor 12 so that the fluid effects operation thereof.

A skid assembly 30, which is in a cage-like form, is mounted to the motor 12 by a split clamp 32. Skids 34 on the skid assembly 30 guide the conduit cleaner 10 smoothly against the inside surface of a conduit within which the cleaner 10 resides.

There are a number of drawbacks inherent in the design of the conduit cleaner in FIG. 1, although it has been very successful on a commercial level. First of all, the nozzle section 22 has a very substantial length, approximately equal to that of the motor 12. In a small unit, the nozzle section 22 may be on the order of three inches long, which, in certain applications, is very significant.

Apart from the size of the nozzle section 22, a fairly intricate interconnection between the nozzle section 22 and motor 12 is present in Latall. The external pipe 28, in addition to complicating the assembly process between the nozzle section 22 and motor 12, projects outwardly beyond the motor 12 sufficiently that it is prone to hanging up on foreign matter within a conduit in operation.

Another problem with the conduit cleaner 10 is that bolts 36, used to connect the nozzle section 22 to the motor 12, are not readily accessible. These bolts 36 must be accessed between the skids 34 and in a radial direction from between an enlarged midportion 38 of the nozzle section 22 and the motor 12. The midportion 38 of the nozzle section 22 prevents free access to the bolts 36 from the trailing end of the conduit cleaner 10. It can be seen that a considerable amount of manipulation of parts is thus required in tight quarters to connect and disconnect the nozzle section 22.

Another problem with the prior art conduit cleaner 10 in FIG. 1 is that the jet orifices 26 are bored directly through the body of the nozzle section 22. As a result, over time, the fluid wears the body to enlarge the effective diameter of the jet orifices 26. This alters the operating characteristics of the conduit cleaner 10. The user is then required to replace the complete nozzle section 22.

Figure 2:
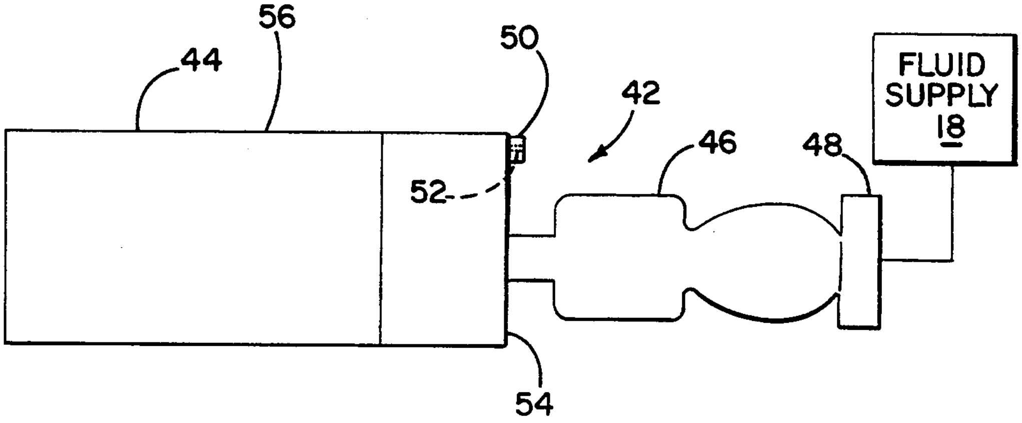
FIG. 2 (PRIOR ART)
FIG. 2 is a side elevation view of a motor and nozzle subassembly for another prior art conduit cleaner.

FIG. 2 shows a prior art conduit cleaner subassembly 42, consisting of a motor 44 and a nozzle section 46. Fluid from a pressurized supply 18 is delivered to an inlet end 48 of the nozzle section 46 and is directed to the motor 44 and exhausted through a fitting 50 away from the subassembly 42. The fitting 50 has a bore 52 therethrough to permit discharge of the fluid. The fitting 50 is threaded into the trailing portion 54 of the nozzle next to the motor 44.

Aside from the previously mentioned problem associated with having the fitting 50 project radially beyond the outer surface 56 of the motor 44 and nozzle part 54, the fitting 50 does not lend itself to the introduction of lubrication for the motor 44. Accordingly, it has been the practice in the prior art to remove the fitting 50, substitute therefor a conventional grease fitting (not shown), effect the lubrication, remove the grease fitting, and replace the fitting 50. This is a time consuming and inconvenient operation. Thus, there may be a tendency of the user to run the unit longer than is desirable to avoid the lubrication process.

Figure 3:
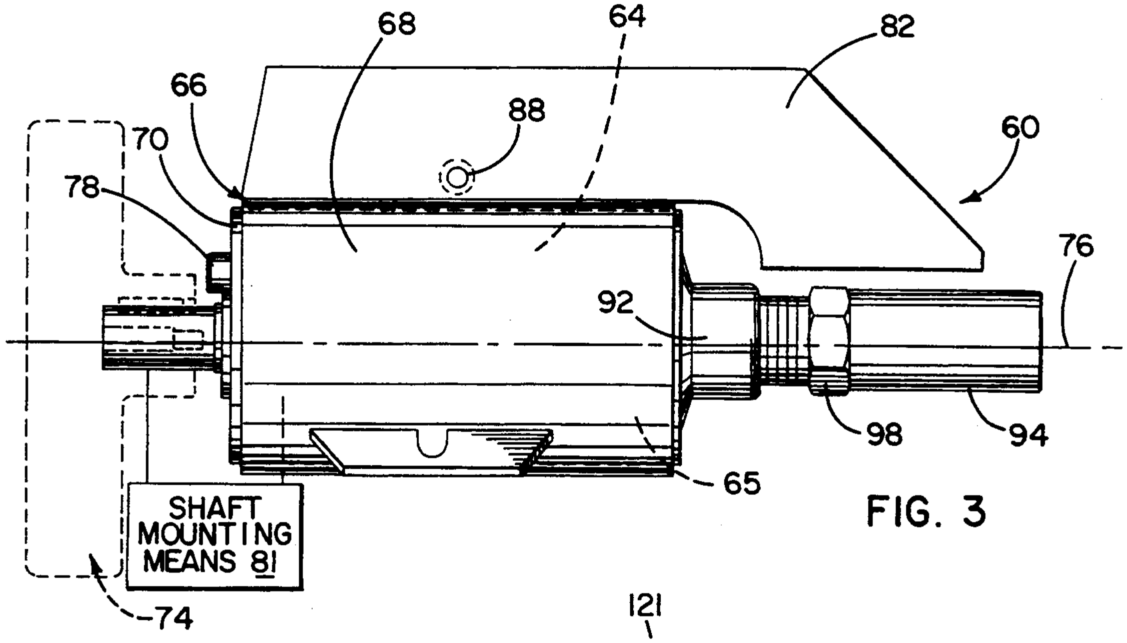
FIG. 3 is a side elevation view of a conduit cleaner incorporating a nozzle, according to the present invention.
Figure 4:
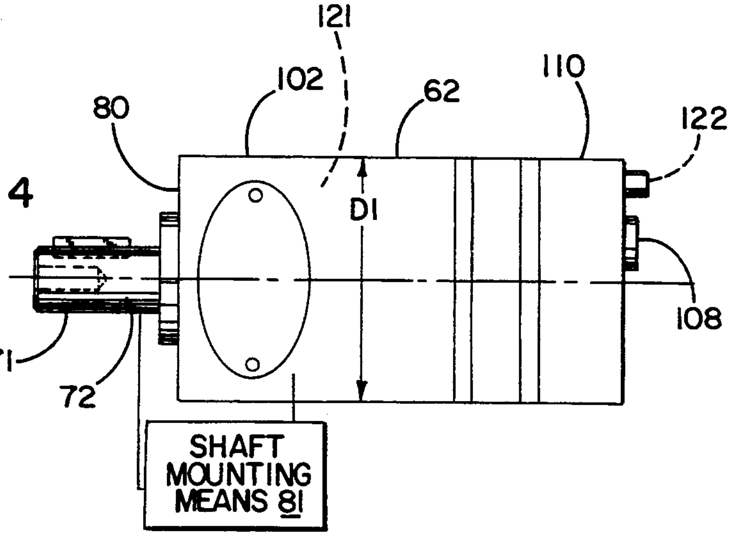
FIG. 4 is a side elevation view of a fluid operated motor on the conduit cleaner of FIG. 3.
Figure 5:
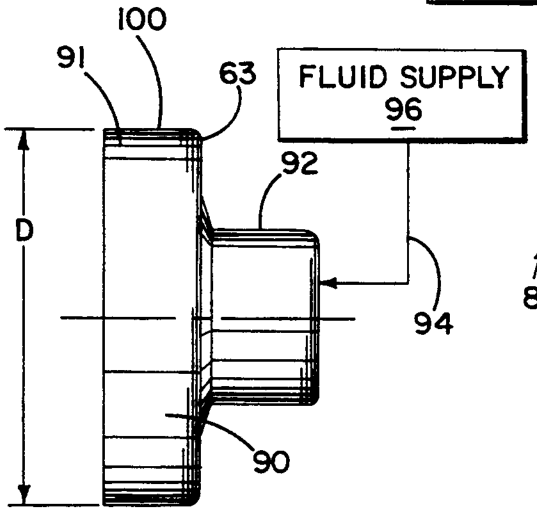
FIG. 5 is a side elevation view of the nozzle according to the present invention.
Figure 6:
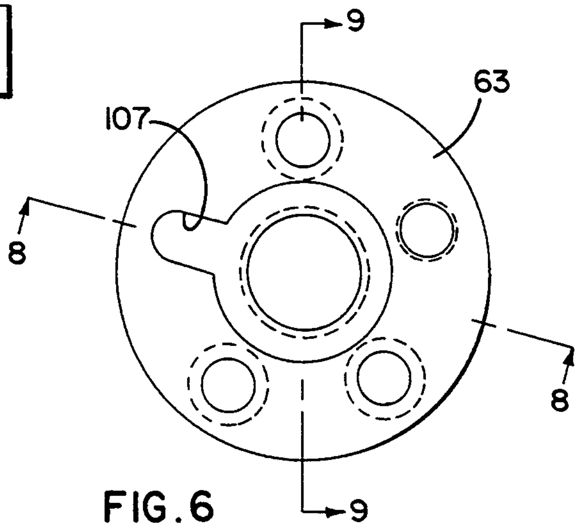
FIG. 6 is an elevation view from one end of the nozzle in FIG. 5.
Figure 7:
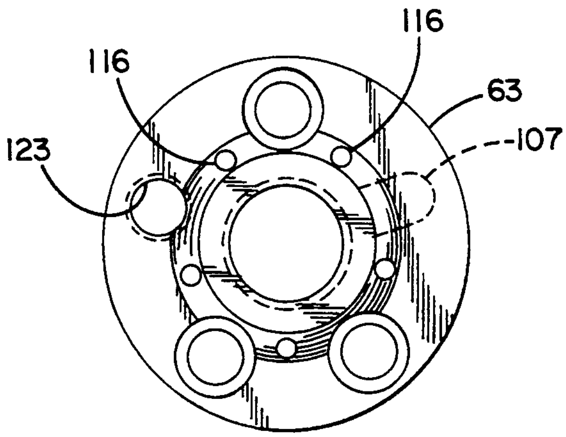
FIG. 7 is an elevation view taken from the end of the nozzle opposite to that in FIG. 6.
Figure 8:
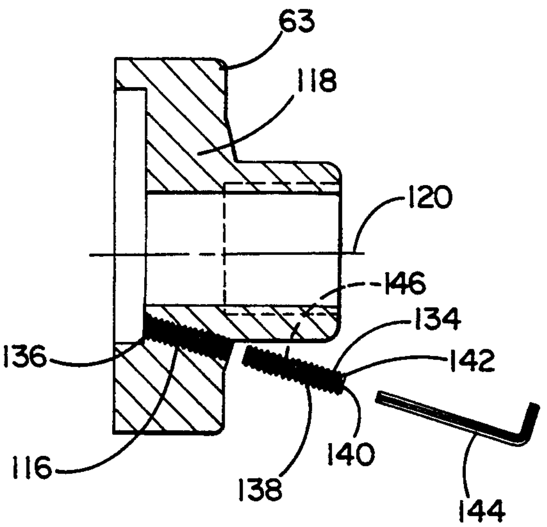
FIG. 8 is a cross-sectional view of the nozzle taken along line 8—8 of FIG. 6.
Figure 9:
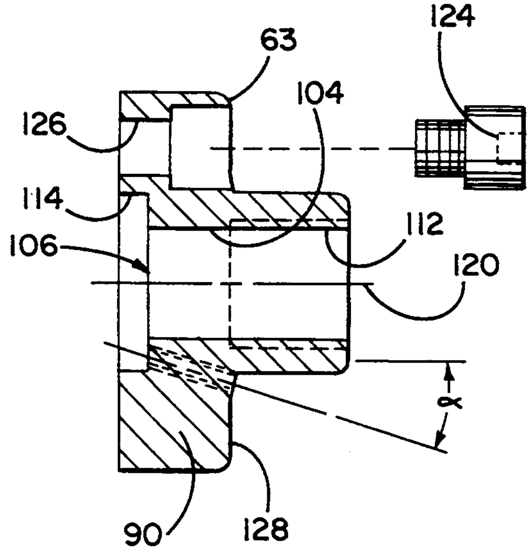
FIG. 9 is a cross-sectional view of the nozzle taken along line 9—9 of FIG. 6.
Figure 10:
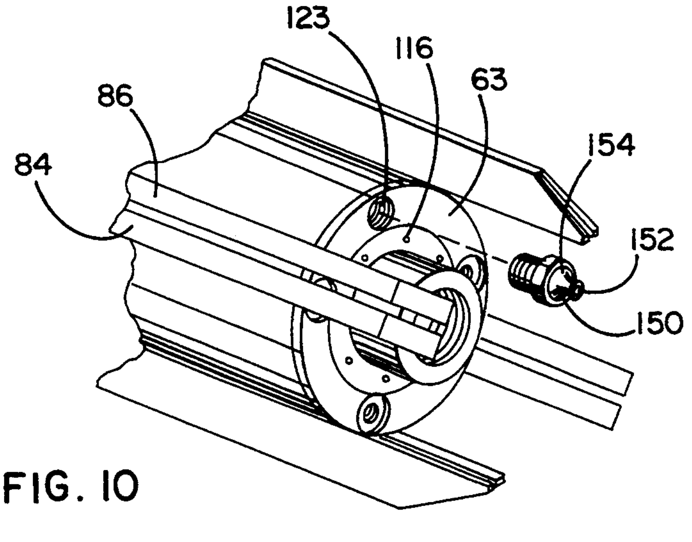
FIG. 10 is a fragmentary rear perspective view of the inventive conduit cleaner showing a grease fitting, according to the present invention, separated therefrom.

The above problems are overcome by the inventive conduit cleaner, shown at 60 in FIG. 3 and described in detail in FIGS. 3–10. The conduit cleaner 60 functions in the same overall manner as the conduit cleaner described in detail in U.S. Pat. 3,740,785, to Latall. That disclosure is incorporated herein by reference. Accordingly, only a brief description of the operation of the conduit cleaner 60 is necessary to establish the environment for the present invention.

The conduit cleaner 60 has a fluid operated motor 62 that is commercially available through Danfoss Incorporated in Rockford, Ill. and sold as its Model OMM 32-151G0033. A nozzle 63 according to the present invention, is connected to the trailing end of the motor 62 so as to define a one-piece power unit 64. The power unit 64 is received within a receptacle 65 defined by a frame 66 having a cylindrical body 68 and a front wall 70 closing the leading end of the body 68. The power unit 64 is extendable from right to left into the receptacle 65 and, in a fully seated position, a free end 71 on a rotatable shaft 72 projects through the front wall 70 to accept a cutting blade assembly 74, which is rotated by the motor 62 about a central axis 76. Bolts 78 fix the leading surface 80 of the motor 62 against the front wall 70 to thereby prevent withdrawal of the motor 62 from the receptacle 64. The shaft 72 is journalled for rotation in the motor housing by a means 81 that has a construction well known to those skilled in the A plurality of skids 82 (one shown) are attached in circumferentially spaced relationship, one each between four equidistantly spaced pairs of mounting plates 84, 86, with there being a pin 88 extending at least partially through each plate pair 84, 86 and a captive skid 82 maintaining the connection therebetween.

The motor 62, which is purchased off the shelf from Danfoss Incorporated, is modified by removing the rear cover thereof and replacing it with the nozzle 63, according to the present invention. The nozzle 63 has a body go with a stepped, cylindrical construction with a large diameter, forward wall 91 and a smaller diameter connector 92 that is internally threaded to operatively connect to a supply conduit 94 that communicates fluid from a supply 96 to the conduit cleaner 60. The supply conduit 94 has a conventional male connector 98 to be threaded into the connector 92.

The wall 91 has an outermost surface 100 with a diameter D equal to the diameter D1 of the motor 62 over substantially the entire length thereof. Accordingly, the nozzle 63 does not project radially beyond the outer surface 102 of the motor 62.

The nozzle 63 has a stepped through bore 104 defining a pressure chamber 106, with there being a localized radial cutout 107 to establish communication between the pressure chamber 106 and inlet port 108 on the motor housing 110. The bore 104 has a small diameter portion 112 and a larger diameter portion 114 forwardly therefrom. The larger diameter portion 114 of the bore 104 has a sufficiently large diameter to radially coincide with through bores/jet orifices 116 on the nozzle body 118. In this version, five jet orifices 116 are provided in equidistantly spaced arrangement around the axis 120 of the nozzle 63. Fluid from the pressure chamber 106 is propelled in a trailing direction, through the jet orifices 116, which are inclined at an angle $\alpha$ equal to approximately 15°. The fluid communicates between the chamber 106 and orifices 116 within the axial extent of the nozzle 63. The particular angle of inclination and size of the jet orifices 116 is a design consideration. The fluid from the jet orifices 116 impinges upon the wall of a conduit within which the conduit cleaner 60 resides and in addition to effecting propulsion of the conduit cleaner 60, scours the inside of the conduit as to break tip deposits thereon, such as fat or paraffin deposits.

The fluid from the supply 96 flows through the bore 104, motor housing inlet 108, through the motor 62 to operate an internal means 121, and exhausts axially from an outlet 122 shown schematically at the rear of the motor housing: 110. The nozzle 63 has a bore 123 aligned with the outlet 122 to exhaust the fluid in a trailing direction. The inventive nozzle 63 requires no external connection to the motor 62 radially outside of the surface 100. Accordingly, a low profile for the power unit 64 can be maintained.

The nozzle 63 is made in one piece, which simplifies construction and reduces manufacturing costs. The functional core of the conduit cleaner, i.e. the power unit 65 consisting of the motor 62 and nozzle 63, is produced by simply connecting the two fully self-contained motor and nozzle units 62, 90. This connection is maintained by three bolts 124 directed forwardly through stepped bores 126 in the nozzle 63 and aligned, pre-tapped blind bores (not shown) in the motor housing 110.

Contrary to the prior art structures, there is no obstruction rearwardly of the bolts 124 created by any part of the nozzle 63. This is a vast improvement over the prior art, previously described. The only rearward projection beyond the rear surface 128 of the wall 91 on the nozzle is the connector 92, which is spaced fully radially inside of the bores 126.

Another aspect of the present invention is the use of a removable fitting 134 within the bores 116. The bores 116 are made larger than the largest anticipated bore opening that will be needed. The bore 116 has threads on its internal surface 136 to cooperate with external threads 138 on the orifice fitting 134. An Allen-type fitting 140 can be used at the exposed end 142 of the orifice fitting 134 to be engaged by a cooperating tool 144 which allows the threading of the orifice fitting 134 into and out of the bore 116.

The fitting 134 has a through bore/orifice 146 through which fluid from the pressure chamber 106 discharges. Consequently, the diameter of the orifice 146 determines the operating characteristics of the conduit cleaner 60.

With this construction, the fitting 134 is replaceable when it is worn. Additionally, fittings 134 having a different size orifice 146 can be used to select the operating characteristics for the conduit cleaner 60. Still further, the fitting 134 can be made from a more durable material than that of the body 118 to avoid the expense of making an entire nozzle 63 from that more expensive material. For example, stainless steel can be used for the fitting 134 while a cheaper material is used for the remainder of the body 118.

Since any maintenance to the nozzle 63 would normally be necessitated by defective orifices 116, the need to replace the nozzle 63 is in most cases obviated by the present invention.

A still further aspect of the invention is the provision of a grease fitting 150 that is threaded into the outlet bore 123 on the nozzle 63. The grease fitting 150 has a through orifice 152 which controls the discharge of fluid from the motor housing outlet 122, which in turn determines the operating characteristics i.e. speed and power of the motor 62. The external surface 154 of the grease fitting is configured to receive a conventional grease gun fitting.

Accordingly, the grease fitting 150 serves the dual purpose of controlling the volume of fluid discharged from the housing outlet 121 and allowing introduction of lubricant to the motor 62 using a conventional grease gun. The fitting 154 does not have to be removed during either operation or lubrication of the motor 52. Accordingly, lubrication is easily and quickly accomplished.

The foregoing disclosure of specific embodiments is intended to be illustrative of the broad concepts comprehended by the invention.

I claim:

1. A power unit for a conduit cleaner, said power unit comprising:

a motor having a housing, a shaft, and means for mounting the shaft to the housing for rotation relative thereto about an axis, said motor including first means responsive to a pressurized fluid for rotating said motor shaft, said housing further defining an inlet for admitting pressurized fluid to the first means for operation thereof and an outlet to permit the discharge of fluid used to operate the first means away from the first means;

a nozzle including a second means for directing fluid from a pressurized supply in a leading direction to the housing inlet and a third means for directing fluid discharged from the outlet out of the power unit; and means for connecting the nozzle to the motor, wherein the nozzle has a body with a substantially cylindrical outer surface and axially spaced ends and the second and third means do not project radially beyond the outer surface of the nozzle, to permit an overall compact construction for the power unit, there being at least one jet orifice defined in said nozzle for directing fluid from a pressurized supply thereof away from said nozzle, said nozzle including fourth means for communicating fluid from a supply in the second means to and through the jet orifice in a trailing direction to externally of the nozzle within the axial extent of the nozzle.

2. The power unit for a conduit cleaner according to claim 1 wherein the nozzle defines a pressure chamber that is in communication with the housing inlet and the nozzle is defined as one piece.

3. The power unit for a conduit cleaner according to claim 1 wherein the jet orifice is in communication with the pressure chamber and is configured to direct fluid angularly with respect to the nozzle axis.

4.A power unit for a conduit cleaner, said power unit comprising:

a motor having a housing, a shaft, and means for mounting the shaft to the housing for rotation relative thereto about an axis, said motor including first means responsive to a pressurized fluid for rotating said motor shaft.

said housing further defining an inlet for admitting pressurized fluid to the first means for operation thereof and an outlet to permit the discharge of fluid used to operate the first means away from the first means;

a nozzle including a second means for directing fluid from a pressurized supply to the housing inlet and a third means for directing fluid discharged from the outlet out of the power unit; and means for connecting the nozzle to the motor, wherein the nozzle has a substantially cylindrical outer surface and the second and third means do not project radially beyond the outer surface of the nozzle, to permit an overall compact construction for the power unit.

wherein the nozzle defines a pressure chamber that is in communication with the housing inlet and the nozzle is defined as one piece, wherein the nozzle has a central axis ad there is at least one jet orifice defined in said nozzle for directing fluid from a pressurized supply thereof away from said nozzle.

wherein the jet orifice is in communication with the pressure chamber and is configured to direct fluid angularly with respect to the nozzle axis, there further being a fitting defining the jet orifice and there are cooperating means on the fitting and nozzle for removably connecting the fitting to the nozzle, whereby fittings having different jet orifice size can be used as desired to alter the operating characteristics of the power unit.

5. The power unit for a conduit cleaner according to claim 4 in combination with first and second fittings each with a jet orifice with means to allow connection of one of the first and second fittings to the nozzle, wherein the first and second fittings have different size jet orifices.

6. A power unit for a conduit cleaner, said power unit comprising:

a motor having a housing, a shaft, and means for mounting the shaft to the housing for rotation relative thereto about an axis.

said motor including first means responsive to a pressurized fluid for rotating said motor shaft, said housing further defining an inlet for admitting pressurized fluid to the first means for operation thereof and an outlet to permit the discharge of fluid used to operate the first means away from the first means:

a nozzle including a second means for directing fluid from a pressurized supply to the housing inlet ad a third means for directing fluid discharged from the outlet out of the power unit; and means for connecting the nozzle to the motor, wherein the nozzle has a substantially cylindrical outer surface and the second and third means do not project, radially beyond the outer surface of the nozzle, to permit an overall compact construction for the power unit, there further being a grease fitting on at least one of the nozzle and motor housing, said grease fitting having a through bore in communication with the housing outlet to allow passage therethrough of fluid discharging from the housing outlet, whereby the grease fitting facilitates introduction of a lubricant to the first means.

7. The power unit for a conduit cleaner according to claim 1 wherein the nozzle and rotor cooperatively define a first subassembly with a substantially cylindrical outer surface and the second and third means do not project radially beyond the outer surface of the first subassembly.

8. The power unit for a conduit cleaner according to claim 7 wherein the outer surface of the subassembly has a substantially constant diameter over substantially the entire axial extent thereof.

9. The power unit for a conduit cleaner according to claim 1 wherein the nozzle defines a pressure chamber in communication with the housing inlet, the motor housing has a cylindrical outer surface with a first, substantially uniform diameter, the nozzle has an outer surface portion with a corresponding first diameter and the pressure chamber resides at least partially in axial coincidence with the nozzle portion having the outer surface with said first diameter.

10. The power unit for a conduit cleaner according to claim 1 wherein the power unit has axially spaced front/leading and rear/trailing ends, the nozzle includes means for operatively connecting the nozzle to the end of a fluid supply conduit, the nozzle has a wall at the trailing end thereof with a flat, rearwardly facing surface, and only the means for operatively connecting to the end of a fluid supply conduit projects axially in a trailing direction beyond said flat, rearwardly facing nozzle surface.

11. The power unit for a conduit cleaner according to claim 10 wherein the means for connecting the nozzle comprises at least one fastener extending axially through the rearwardly facing flat surface on the nozzle and into the motor housing.

12. The power unit for a conduit cleaner according to claim 11 wherein the at least one fastener resides fully radially outside of the means on the nozzle for operatively connecting to the end of a fluid supply conduit to be readily accessible for the trailing end of the power unit.

13. A nozzle for use in conjunction with a fluid operated motor having a shaft, a housing defining a fluid inlet and outlet, and means for mounting the shaft to the housing for rotation relative to the housing about an axis, said nozzle comprising:

a body having first means for directing fluid from a pressurized supply to an inlet on a motor housing and a second means for directing fluid discharged from a motor housing outlet to externally of the nozzle, there being at least one bore in the nozzle body for directing incoming fluid from a pressurized supply simultaneously in a prescribed pattern to externally of the nozzle;

a fitting having a through opening; and means for connecting the fitting to the body at least partially within the nozzle body bore so that incoming fluid from a pressurized supply can flow through the bore in the nozzle body and the through opening in the fitting.

14. The power unit for a conduit cleaner according to claim 13 wherein the means for connecting the fitting to the body comprises means for removably connecting the fitting to the body so that fittings with different size bores therethrough can be interchanged.

15. The power unit for a conduit cleaner according to claim 13 wherein the bore in the nozzle body has spaced first and second ends and the fitting extends substantially fully between the spaced ends of the nozzle body bore.

16. The power unit for a conduit cleaner according to claim 14 wherein the means for connecting the fitting to the body comprises cooperating threads on the nozzle body and fitting to allow the fitting to be threaded into and out of the nozzle body and the fitting has a receptacle for a tool that can be used to rotate the fitting.

17. A power unit for a conduit cleaner, said power unit comprising:

a motor having a housing, a shaft and means for mounting the shaft for movement relative to the housing about an axis, said motor including first means responsive to a pressurized fluid for rotating said motor shaft, said housing further defining an inlet for admitting pressurized fluid to the first means for operation thereof and an outlet to permit the discharge of fluid used to operate the first means away from the first means;

a nozzle including a second means for directing fluid from a pressurized supply to the housing inlet and a third means for directing fluid discharged from the outlet out of the power unit;

means for connecting the nozzle to the motor; and a grease fitting on at least one of the nozzle and motor housing, said grease fitting having a through bore in communication with the housing outlet to allow passage therethrough of fluid discharging from the housing outlet, whereby the grease fitting also facilitates introduction of a lubricant to the first means.

18. The power unit according to claim 17 wherein cooperating means are provided on the grease fitting and the at least one of the nozzle and motor housing to removably connect the grease fitting to the at least one of the nozzle and motor housing.

19. The power unit according to claim 17 wherein the grease fitting is configured to connect to a conventional grease gun.

* * * * *